| United States Patent [19] | [11] | 4,340,528 |
|---|---|---|
| Marsh | [45] | * Jul. 20, 1982 |

[54] PIGMENTED POLYOLEFIN COMPOSITIONS

[75] Inventor: Harold P. Marsh, Kingsport, Tenn.

[73] Assignee: Eastman Kodak Company, Rochester, N.Y.

[*] Notice: The portion of the term of this patent subsequent to Jul. 27, 1999, has been disclaimed.

[21] Appl. No.: 202,402

[22] Filed: Oct. 31, 1980

[51] Int. Cl.$^3$ ............................................. C08L 67/00
[52] U.S. Cl. ..................................... 524/513; 525/177
[58] Field of Search ................ 260/40 R, 40 P, 42.45, 260/42.46, 42.21; 525/177

[56] References Cited

U.S. PATENT DOCUMENTS 3,223,752 12/1965 Tate et al. ............................ 525/177
3,419,638 12/1968 Fuzek ................................... 525/177

Primary Examiner—J. Ziegler
Attorney, Agent, or Firm—John F. Stevens; Daniel B. Reece, III

[57] ABSTRACT

Disclosed are polyolefin compositions comprising polyethylene or polypropylene, at least one pigment in an amount sufficient to provide color to said polyolefin, and from about 0.1 to about 4.0%, based on the weight of said polyolefin, of a polyester. Use of the polyester in the composition permits much less pigment to be used.

7 Claims, No Drawings

PIGMENTED POLYOLEFIN COMPOSITIONS

TECHNICAL FIELD

This invention relates to compositions of pigmented plastic grade polyolefins containing a small amount of a polyester.

BACKGROUND ART

In the past, it has been conventional practice to include in molding and extrusion grade polyolefins various organic and inorganic pigments to color the polymer. It has now been found that the quantity of such pigments may be substantially reduced while obtaining similar results by the incorporation into the polyolefin, of a small amount of a less expensive polyester.

DISCLOSURE OF THE INVENTION

The present invention provides compositions comprising a polyolefin, at least one pigment in an amount sufficient to provide color to the polyolefin, and from about 0.1 to about 4.0% (preferably about 1 to about 3%) based on the weight of the polyolefin, of a polyester. The polyester improves the efficiency of the pigment, allowing use of a much smaller amount of pigment and thereby provide a considerable savings in cost.

According to the present invention, there is provided a plastic grade, pigmented polyolefin composition which contains a small amount of polyester to aid in the effectiveness of the pigment.

The polyolefins useful in the present invention are polyethylene and polypropylene having a density (D) of between about 0.90 and about 0.98 (preferably about 0.91–0.96) and a Flow Rate or Melt Index of about 0.1 to about 24.0.

Useful pigments used in the polyolefins include organic pigments such as phthalocyanine blues and greens, quinacridone reds and isoindolinoline yellows, and inorganic pigments such as iron oxide, cobalt aluminate, lead cromate, chromic oxide, ultramarine blues, cobalt lithium phosphate, cobalt magnesium boride, and codmium yellows, oranges and reds. In the past, these pigments have been commonly used in amounts of up to about 1% based on the weight of the polyolefin. In accordance with the present invention, however, the quantity of pigment used may be substantially reduced.

The polyester used in the compositions of the present invention are described as having an inherent viscosity (I.V.) of from about 0.6 to about 1.0, a melting point of from about 90° to about 150° C., a melt index of from about 10 to about 100 and a heat of fusion of about 0.1 to about 12 calories per gram. Preferred polyesters are those in which at least 40 mole percent of the acid moieties are terephthalic acid moieties and the dihydric alcohol contains about 40–100 mole percent 1,6-hexanediol and 0 to about 60 mole percent 1,4-butanediol.

Polyesters described in U.S. Pat. No. 4,046,837 are suitable for use in the composition of this invention.

The preferred copolyesters contain terephthalic acid moieties. These "terephthalic moieties" can be supplied by the usual terephthalic moiety sources, e.g., terephthalic acid, terephthalic chloride and the mono- and dialkyl esters of terephthalic acid. Thus, the term "terephthalic moiety" or "terephthalic acid moiety" is to be considered as including those moieties supplied by the acid chloride or a mono- or diester.

In these preferred polyesters, if a portion of the terephthalic acid moiety is replaced by a second acid moiety, it is replaced by a saturated aliphatic dicarboxylic acid having terminal carboxylic acid groups having from 4 to about 34 carbon atoms between the two carboxyl groups. Preferably, the saturated aliphatic dicarboxylic acid contains between 4 and 8 carbon atoms between the carboxyl groups. Examples of aliphatic dicarboxylic acids contemplated include adipic, glutaric, azelaic or sebacic acid or mixtures thereof. Alternatively, 1 to 60 mol % of the terephthalic acid content can be replaced by isophthalic acid. As a third alternative, a portion of the terephthalic acid content can be replaced by an isophthalic acid moiety or a moiety of one or more saturated aliphatic dicarboxylic acids.

The diol component of the copolyesters of the invention preferably comprises a mixture of 1,4-butanediol and 1,6-hexanediol were the combined quantities of these diols constitute all of the diol component.

With respect to the aliphatic or the named aromatic dicarboxylic acids, polyesters forming derivatives can be used in the preparation of the polyester, especially the mono- or dialkyl esters of the named dicarboxylic acids, especially $C_1$–$C_4$ mono- or dialkyl esters, particularly the dimethyl esters.

Other suitable diols include those such as, for example, ethylene glycol, diethylene glycol, propylene glycol, and cyclohexanedimethanol.

The preparation of the copolyesters of the invention can be performed in a conventional manner. For example, the method of preparation can be similar to that of polyethylene terephthalate. There follows a description of a typical method for preparing the copolyester. Other techniques can be used where the terephthalic acid moiety is supplied by terephthalic acid itself rather than from an ester. In some cases, direct esterification can be employed. Those of skill in the polyester art well known the manipulative procedures whereby polyesters and copolyesters of terephthalic acid and dihydric alcohols can be employed. The manipulative procedure by which the copolyesters are prepared does not differ. Additionally, the relative amounts of these components determine the characteristics of the resultant polyester.

In an autoclave provided with a stirrer, for example, dimethylterephthalate and dimethylisophthalate can be esterified in a molar ratio of 90:10, for example, with a mixture of 1,4-butanediol and 1,6-hexanediol (in a molar ratio of 35:65 for example) in the presence of a transesterification catalyst such as tetra n-butyltitanate and, if desired, zinc acetate dihydrate. The acid component and diol component can be used in equimolar amounts; preferably, excess amounts of the diol component are used, e.g., a diol to acid moiety mol ratio of 1.1:1.6, preferably 1.2:1.4.

At an internal temperature of about 150°–200° C., the methanol is distilled out at normal pressure. After injecting triphenylphosphite with a small amount of diol, for the purpose of inhibiting the transesterification catalyst, the autoclave is evacuated and the internal temperature is raised to 270° C. After about an hour the pressure is reduced to less than one Torr, and after an additional 3 to 4 hours of stirring, the vacuum is broken by the introduction of nitrogen, and the contents of the autoclave are removed through the bottom valve and granulated. After preliminary preparation in a high-speed mixer, for example, the mixtures can be homogenized by means of an extruder or kneader at, for example, 180° C.

The melting point of the copolyesters is given as the melting maximum of the differential-thermocalorimetry (DSC-1, Perkin-Elmer, heating rate 16° C./min).

Flow Rate (FR) is measured at 230° C. using a weight of 2.16 kg in accordance with ASTM D-1238, Condition L. Melt Index (MI) is measured at 190° C. with a 2.16 kg load in accordance with ASTM D-1238 Condition E.

The polyolefin, pigment and polyester may be melt compounded in a batch mixer (e.g., Banbury Mixer) or for larger runs can be dry blended in any convenient mixer (e.g., standard sigma blade mixers) and then melt compounded (e.g., in a Farrel continuous mixer). The product may then be put into a suitable form, such as pellets, for molding or extrusion. If a white pigment such as zinc or titanium dioxide is to be used to make lighter colors, the colorant may be predispersed in it to provide better color dispersion and greater accuracy in weighing. This can be done in any convenient high speed blender.

The examples which follow are submitted for a better understanding of the invention.

In the examples, the polyesters are described as follows:

Polyester "A"—derived from 100 mole % terephthalic acid, 80 mole % 1,6-hexanediol and 20 mole % 1,4-butanediol; I.V.=0.72, Melting Point=125° C. and Melt Index=70.

Polyester "B"—derived from 80 mole % terephthalic acid, 20 mole % isophthalic acid, 80 mole % 1,6-hexanediol and 20 mole % 1,4-butanediol; I.V.=0.72, Melting Point=100° C. and Melt Index=47.

Polyester "C"—derived from 75 mole % terephthalic acid, 25 mole % adipic acid, 75 mole % ethylene glycol and 25 mole % 1,4-butanediol; I.V.=0.80; Melting Point=138° C. and Melt Index=21.

Polyester "D"—derived from 80 mole % terephthalic acid, 20 mole % glutaric acid, 80 mole % 1,6-hexanediol and 20 mole % diethylene glycol; I.V.=0.72, Melting Point=128° C. and Melt Index=84.

Polyester "E"—derived from terephthalic acid with 20 wt. % succinic anhydride (total 100 mole percent acid), 20 mole % 1,4-butanediol and 80 mole % 1,6-hexanediol; I.V.=0.84, Melting Point=97°-127° C. and Melt Index=41.

In the following Examples 1-7, polyethylene I containing 5% zinc oxide is used in several samples to evaluate color intensity:

| | | Color Intensity, K/S | |
|---|---|---|---|
| Example | Pigment | With Polyester A | Without Polyester |
| 1 | Blue inorganic, 0.3% | 0.9 | 0.6 |
| 2 | Blue organic, 0.01% | 1.35 | 1.0 |
| 3 | Red inorganic, 0.3% | 2.3 | 1.5 |
| 4 | Red organic, 0.1% | 1.67 | 1.25 |
| 5 | Yellow inorganic, 0.3% | 1.45 | 1.26 |
| 6 | Yellow organic, 0.1% | 2.05 | 1.55 |
| 7 | Purple organic, 0.22% | 0.18 | 0.13 |

In the following Examples 8-14, polyethylene I containing 5% zinc oxide is used in several samples to evaluate the effectiveness of Polyester A in reducing the required colorant content. The amounts of pigment required to result in approximately the same color intensities are shown:

| Ex. | Pigment | % Pigment Required | Color Intensity K/S (Apx.) |
|---|---|---|---|
| 8 | Blue inorganic | 0.3% without polyester 0.168% with polyester | 0.6 |
| 9 | Blue organic | 0.01% without polyester 0.007% with polyester | 1.03 |
| 10 | Red inorganic | 0.3% without polyester 0.21% with polyester | 1.5 |
| 11 | Red organic | 0.1% without polyester 0.064% with polyester | 1.2 |
| 12 | Yellow inorganic | 0.3% without polyester 0.252% with polyester | 1.3 |
| 13 | Yellow organic | 0.1% without polyester 0.075 with polyester | 1.6 |
| 14 | Purple organic | 0.002% without polyester 0.0013% with polyester | 0.14 |

In the following Examples 15-20, polyethylene I containing 5% zinc oxide and 0.3% blue inorganic pigment is used in evaluating several different polyesters:

| | | Color Intensity, K/S | |
|---|---|---|---|
| Ex. | Polyester | With Optional Brightener | Without Optional Brightener |
| 15 | None | 0.76 | 0.6 |
| 16 | A | 1.01 | 0.88 |
| 17 | B | 0.98 | 0.94 |
| 18 | C | 1.20 | 1.15 |
| 19 | D | 1.0 | 0.95 |
| 20 | E | | 0.8 |

In the following Examples 21-24, polyester A is used in several different polyolefins and the color intensity is determined. Five % zinc oxide and 0.3% blue organic pigment is used.

| | | Color Intensity, K/S | |
|---|---|---|---|
| Ex. | Polyolefin | With Polyester | Without Polyester |
| 21 | I | 0.9 | 0.6 |
| 22 | II | 0.75 | 0.65 |
| 23 | III | 0.78 | 0.71 |
| 24 | IV | 0.9 | 0.75 |

In Examples 21-24, the polyolefins are described as follows:

| I | Medium Density Polyethylene MI = 8    D = 0.935 |
|---|---|
| II | Low Density Polyethylene MI = 7    D = 0.917 |
| III | High Density Polyethylene MI = 0.6    D = 0.960 |
| IV | Standard Polypropylene FR = 4    D = 0.904 |

In the above examples, the pigments are described in the following table:
blue inorganic—cobalt aluminate
blue organic—phthalocyanine blue
red inorganic—red iron oxide
red organic—quinacridone red
yellow inorganic—lead chromate
yellow organic—isoindolinoline yellow
purple organic—quinacridone magenta In the examples, zinc oxide is added for the purpose of increasing the sensitivity of the color measurement.

Color intensity is measured in terms of K/S, wherein K is the standard absorbant coefficient and S is the standard scattering coefficient. K/S therefore is the ratio of absorbance to scattering, and is a standard color measurement reference.

The K/S relationship is covered by the Kubelka-Munk equations, the use and application of which is known in the art. See, for example, "Color in Business, Science and Industry" by D. B. Judd and G. Wyszecki (Wiley 1952 and 1963). As indicated in the examples, much less pigment is required using the polyester additive than without the polyester additive.

Whenever the term "inherent viscosity" (I.V.) is used herein, it will be understood to refer to viscosity determinations made at 25° C. using 0.25 gram of polymer per 100 ml. of a solvent composed of 60 percent phenol and 40 percent tetrachloroethane.

For purposes herein, the term "melting point" (Tm) means that temperature at which the solid and liquid phases of the material are at equilibrium at atmospheric pressure.

The "heat of fusion" ($\Delta H_f$) of polymers is the amount of heat evolved when crystallizable polymers are melted. $\Delta H_f$ values are readily obtained using Differential Scanning Calorimeters (Perkin-Elmer). For example, one method for determining $\Delta H_f$ is described in Journal of Applied Polymer Science, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

Unless otherwise specified, all parts, percentages, ratios, etc., are on a weight basis.

The invention has been described in detail with particular reference to preferred embodiments thereof, but it will be understood that variations and modifications can be effected within the spirit and scope of the invention.

I claim:

1. Polyolefin composition comprising polyethylene or polypropylene having a density of between about 0.90 and about 0.98, at least one pigment in an amount sufficient to provide color to said polyolefin, and from about 0.1 to about 4.0%, based on the weight of said polyolefin, of a polyester having an I.V. of from about 0.6 to about 1.0, a melting point of from about 90° to about 150° C. and a melt index of from about 10 to about 100.

2. Composition according to claim 1 wherein said polyester is present in an amount of about 1% to about 3% based on the weight of said polyolefin.

3. Composition according to claim 1 wherein said polyolefin has a density of from about 0.91 to about 0.96.

4. Composition according to claim 1 wherein said polyolefin is polyethylene having a Melt Index of about 0.1 to about 24.0.

5. Composition according to claim 1 wherein said polyolefin is polypropylene having a Flow Rate of about 0.1 to about 24.0.

6. Composition according to claim 1 wherein said polyester is derived at least in part from terephthalic acid as the dicarboxylic acid component and at least in part from 1,4-butanediol or 1,6-hexanediol as the glycol component.

7. Composition according to claim 1 wherein said pigment is present in an amount of less than 0.5% based on the weight of said polyolefin.

* * * * *